United States Patent
Michiels

(10) Patent No.: US 10,015,009 B2
(45) Date of Patent: Jul. 3, 2018

(54) PROTECTING WHITE-BOX FEISTEL NETWORK IMPLEMENTATION AGAINST FAULT ATTACK

(71) Applicant: NXP B.V., Eindhoven (NL)

(72) Inventor: Wilhelmus Petrus Adrianus Johannus Michiels, Eindhoven (NL)

(73) Assignee: NXP B.V., Eindhoven (NL)

( * ) Notice: Subject to any disclaimer, the term of this patent is extended or adjusted under 35 U.S.C. 154(b) by 41 days.

(21) Appl. No.: 14/952,737

(22) Filed: Nov. 25, 2015

(65) Prior Publication Data

US 2017/0149559 A1    May 25, 2017

(51) Int. Cl.
  G06F 11/30    (2006.01)
  G06F 12/14    (2006.01)
  H04L 9/06    (2006.01)
  H04L 9/00    (2006.01)

(52) U.S. Cl.
  CPC ............ H04L 9/0625 (2013.01); H04L 9/004 (2013.01); H04L 2209/16 (2013.01)

(58) Field of Classification Search
  None
  See application file for complete search history.

(56) References Cited

U.S. PATENT DOCUMENTS

| | | | | |
|---|---|---|---|---|
| 5,511,123 A * | 4/1996 | Adams | ..................... | H04L 9/002 380/29 |
| 5,745,577 A * | 4/1998 | Leech | ..................... | H04L 9/002 380/259 |
| 6,314,186 B1 * | 11/2001 | Lee | ..................... | H04L 9/002 380/28 |
| 2004/0139340 A1 * | 7/2004 | Johnson | ..................... | G06F 21/14 713/194 |
| 2006/0269063 A1 * | 11/2006 | Hauge | ..................... | G06F 21/10 380/262 |
| 2007/0014394 A1 | 1/2007 | Harder et al. | | |
| 2008/0019503 A1 * | 1/2008 | Dupaquis | ..................... | H04L 9/0625 380/28 |
| 2010/0098244 A1 * | 4/2010 | Ciet | ..................... | H04L 9/002 380/29 |
| 2010/0299515 A1 * | 11/2010 | Michiels | ..................... | G06F 21/10 713/150 |

(Continued)

OTHER PUBLICATIONS

Pichler, F.: Finite state machine modelling of cryptographic systems in LOOPS. Advances in cryptology—EUROCRYPT '87, Lecture Notes in Computer Science, Springer-Verlag, Berlin, 1988,65-73.*

(Continued)

*Primary Examiner* — Christopher Revak
*Assistant Examiner* — Vadim Savenkov

(57) ABSTRACT

A method of implementing a method of mapping an input message to an output message by a keyed cryptographic operation, wherein the keyed cryptographic operation includes a plurality of rounds using a Feistel network, including: receiving an input having a first half and a second half; performing, by a basic block, a portion of a round function on the second half to produce a portion of an encoded output, and wherein the basic block provides a portion of the second half as a portion of an encoded first input to a next round; and XORing the portion of the encoded output and a portion the first half to produce a portion of an encoded second input to the next round.

12 Claims, 8 Drawing Sheets

(56) References Cited

U.S. PATENT DOCUMENTS

| | | | | |
|---|---|---|---|---|
| 2012/0045050 A1* | 2/2012 | Farrugia | ............... | H04L 9/0631 380/28 |
| 2012/0170740 A1* | 7/2012 | Lee | ....................... | H04L 9/0618 380/44 |
| 2013/0198851 A1* | 8/2013 | Spies | .................... | H04L 9/0625 726/26 |
| 2014/0198912 A1* | 7/2014 | Mantin | ................. | H04L 9/0637 380/28 |
| 2015/0312042 A1 | 10/2015 | Michiels et al. | | |

OTHER PUBLICATIONS

Chow, "A White-Box DES Implementation for DRM Applications", Digital Rights Management: ACM CCS-9 Workshop—DRM 2002 Washington, D.C. Nov. 18, 2002.

Chow, et al., "White-Box Cryptography and an AES Implementation", Selected Areas in Cryptography: 9th Annual International Workshop, SAC 2002, St. John's, Newfoundland, Canada, Aug. 15-16, 2002, 250-270, 18 pages.

Mukhopadhyay, "An Improved Fault Based Atack of the Advanced Encryption Standard", Proceedings of the 2nd International Conference on Cryptology in Africa: Progress in Cryptology (Africacrypt'09), pp. 421-434, 2009.

Thomas, J., "Survey of Data Encryption", 24 pages, https://cdn.preterhunnan.net/texts/cryptrography/theory.des, downloaded Mar. 4, 2017.

Chow., S., "A White-Box DES Implementation for DRM Applications", Research carried out at Cloakware Corp.; Working draft pre-conf record for ACM DRM-2 Workshop, Version: Oct. 10, 2002.

Harder, W., et al., "Syncrosoft MCFACT™ Secure Data Processing Technology," Re-Trust Sixth Quarterly Meeting, Villach, Austria; Mar. 11, 2008.

Michiels, W., "Opportunities in White-Box Cryptography;" IEEE Security & Privacy; DOI: 10.1109/MSP.2010.44; pp. 64-67; Published in vol. 8, Issue: 1, Jan.-Feb. 2010.

* cited by examiner

PROTECTING WHITE-BOX FEISTEL NETWORK IMPLEMENTATION AGAINST FAULT ATTACK

TECHNICAL FIELD

Various exemplary embodiments disclosed herein relate generally to securing software components that perform a cryptographic function using Feistel networks against fault attacks.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software.

Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of mapping an input message to an output message by a keyed cryptographic operation, wherein the keyed cryptographic operation includes a plurality of rounds using a Feistel network, including: receiving an input having a first half and a second half; performing, by a basic block, a portion of a round function on the second half to produce a portion of an encoded output, and wherein the basic block provides a portion of the second half as a portion of an encoded first input to a next round; and XORing the portion of the encoded output and a portion the first half to produce a portion of an encoded second input to the next round.

Further various exemplary embodiments relate to a non-transitory machine-readable storage medium encoded with instructions for implementing mapping an input message to an output message by a keyed cryptographic operation, wherein the keyed cryptographic operation includes a plurality of rounds using a Feistel network, including: instructions for receiving an input having a first half and a second half; instructions for performing, by a basic block, a portion of a round function on the second half to produce a portion of an encoded output, and wherein the basic block provides a portion of the second half as a portion of an encoded first input to a next round; and instructions for XORing the portion of the encoded output and a portion the first half to produce a portion of an encoded second input to the next round.

Various embodiments are described wherein the round function includes a key addition, a substitution function, a permutation function, and an expansion operation.

Various embodiments are described wherein the keyed cryptographic function is the data encryption standard.

Various embodiments are described wherein the basic block is a lookup table.

Various embodiments are described wherein the basic block is a finite state machine.

Further various exemplary embodiments relate to a method of mapping an input message to an output message by a data encryption standard (DES) cryptographic operation, wherein the DES cryptographic operation includes a plurality of basic blocks, including: receiving an input having a first half including eight at-least-4-bit portions and a second half including eight at-least-4-bit portions; performing, by eights basic blocks, a portion of a round function on the second half to produce eight encoded at-least-4 bit portions of an encoded output, and wherein the plurality of basic blocks provides the eight at-least-4-bit portions of the second half as an encoded first input to a next round; and performing eight XORs of eight encoded at-least-4-bit portions of the encoded output and the eight at-least-4-bit portions of the first half to produce eight at-least-4-bit-bit portions of an encoded second input to the next round.

Further various exemplary embodiments relate to a non-transitory machine-readable storage medium encoded with instructions for implementing mapping an input message to an output message by a data encryption standard (DES) cryptographic operation, wherein the DES cryptographic operation includes a plurality of basic blocks, including: instructions for receiving an input having a first half including eight at-least-4-bit portions and a second half including eight at-least-4-bit portions; instructions for performing, by eights basic blocks, a portion of a round function on the second half to produce eight encoded at-least-4bit portions of an encoded output, and wherein the plurality of basic blocks provides the eight at-least-4-bit portions of the second half as an encoded first input to a next round; and instructions for performing eight XORs of eight encoded at-least-4-bit portions of the encoded output and the eight at-least-4-bit portions of the first half to produce eight at-least-4-bit-bit portions of an encoded second input to the next round.

Various embodiments are described wherein the round function includes a key addition, a substitution function, a permutation function, and an expansion operation.

Various embodiments are described wherein each of the basic blocks includes receiving an at-least 4-bit input, performing a key addition on the at-least-4-bit input, inputting the output of the key addition to a substitution function, and applying a linear mapping on the output of-substitution function to produce a basic block output.

Various embodiments are described wherein producing eight encoded at least-4-bit portions of an encoded output further comprising combining the basic block outputs from the eight basic blocks to produce the 48-bit encoded output.

Various embodiments are described wherein the plurality of basic blocks is a plurality of lookup tables.

Various embodiments are described wherein the plurality of basic blocks is a plurality of finite state machines.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
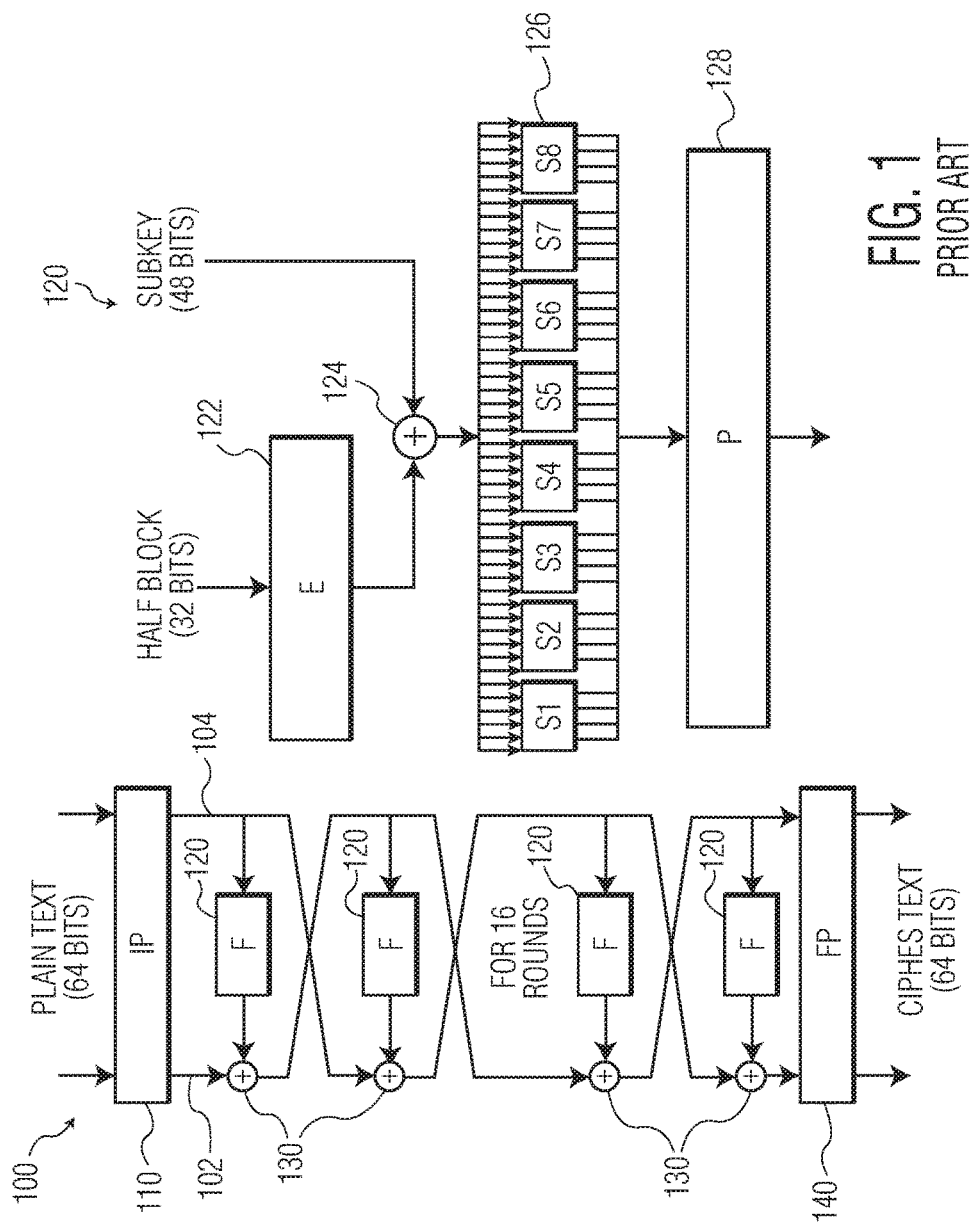
FIG. 1 illustrates the DES cipher.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The input message can represent, e g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACS. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number of input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message.

In a differential fault analysis (DFA) attack the input/output behavior of the white-box implementation is studied when faults are injected at a single position in the white-box implementation. Injecting faults in a white-box implementation and observing the changed behavior is a powerful tool to extract the cryptographic key from the white-box implementation of a cryptographic algorithm. Within the white-box environment, injecting a fault is particularly easy. Not only can an attacker change an intermediate result, he even can set it very precisely to any desired value.

A Feistel cipher, of which DES is the most well-known example, has the following structure. A data block is split into two equal parts: a left half and a right half. The cipher operates on these halves in a number of rounds. Each round is parameterized with a round key. Denote the input to round r by $(L_r, R_r)$ and its round key by $K_r$, where $L_r$ is the left half and $R_r$ the right half, then for a round function $f$ a round computes the following:

$$L_{r+1}=R_r$$

$$R_{r+1}=L_r \oplus f(R_r, K_r)$$

if it is not the last round and $$L_{r+1}=L_r \oplus f(R_r, K_r)$$

$$R_{r+1}=R_r$$

if it is the last round. This structure is the same for both the encryption and the decryption part of the cipher.

The idea of an iterated cipher is that although a single round is not very secure, meaning that the round key can easily be extracted from its input-output behavior, it becomes secure if a round is repeated a sufficient number of times. Hence, when building a white-box implementation, it is important that an attacker cannot extract the plain input and output of a single round from the implementation. If the input to the cipher is plain, i.e., not encoded by an external encoding, then this implies that the output of the first round should be hidden. This is generally realized in white-box implementations by encoding all intermediate results.

Considering the first round of a Feistel cipher, it can be seen that bits from $R_0$ are used both as input to the round function and as the left half of the next round. Suppose that a white-box implementation is such that the value of bits from $R_0$ for these 2 usages can be set independently. This means that the value of a bit from $R_0$ can be changed when it is used as input to the round function without changing its value for when it is used for the new left half $L_1$.

Suppose that an attacker uses this property to change a few (e.g., one) bits from the input to the round function, where the values of these bits only affect a limited number of bits in the output of the round function. Then let V be the set of locations where the round function's output may change. For DES, for instance, changing a single input bit of the round function can only affect 4 bits in the output when this single bit is not copied by the expansion operator. Obviously, the attacker can undo this change of the round function result by altering the value of the left-half bits of $L_0$ that are located at positions from V. Furthermore, the way that those values have to be altered reveals the change of the round function.

Hence, this gives an attacker an approach for deriving an initial input to the round function, a set of changes to this initial input, and for each of these changes the resulting change in the round function output. This is sufficient to extract the key if the round function does not provide sufficient security by itself. As indicated before, this is generally the case: the round function only provides sufficient security when applied a sufficient number of times.

Note that in a white-box environment, this attack is easy to perform. The attacker may introduce a fault at the start of the first round, and the attacker only has to observe the result at the output of the algorithm. So the attacker does not need to spend a lot of effort in understanding (reverse-engineering) the white-box implementation.

As described above, an implementation of a cryptographic algorithm can be viewed as a network of basic blocks, where a basic block is the implementation of a function that cannot be interrupted. For instance, in the table-based white-box implementation of Chow et al., the lookup tables are the basic blocks. In a finite-state-machine approach, the finite state machines are the basic blocks. In another example, a standard implementation obfuscated by source-to-source code obfuscation transformations includes individual instructions that are the basic blocks.

Embodiments of the invention may include the following. Let b be a bit from the right-half input $R_0$ of a Feistel cipher, and let B be a basic block that has b or an encoding of b as input. Then, it is not possible to compensate for a change of b in the input of B by changing the value of the left-half input $L_0$ in the same way as the change of b affects the round function output. In other words, changes cannot be made to (1) bit b in the input of B and (2) the left-half input $L_0$ such that the output of the complete cipher gives the same output before and after applying the changes of (1) and (2).

In a more concrete example, this means that if a part of the output of a basic block B is added to $L_0$ to obtain $R_1$, where this part is dependent of b, then the output of B also contains a part that is dependent of b which contributes to $L_1$.

An embodiment will now be shown applying the above described ideas to a table-based white-box DES implementation. First, there will be a brief discussion of the DES cipher. Next, a white-box implementation of DES will be described. This white-box implementation is a simplified version of the one presented by Chow et al. This white-box implementation will have the vulnerabilities described above. Finally it will be shown how the ideas described above can be applied to protect against these attacks.

Chow presents white-box implementations for AES and DES. What these white-box implementations have in common is that they implement the cipher by means of an obfuscated table network. As these white-box implementations are rather complicated to discuss, a simpler implementation will be used to explain the embodiments described herein. However, this simpler white-box implementation still has the essential properties of Chow's white-box implementation being that all operations are written as obfuscated lookup tables and that all intermediate results are encoded. Below, this simplified white-box DES implementation is discussed.

FIG. 1 illustrates the DES cipher. Encryption and decryption only differ from each other in the order of the round keys. The DES cipher 100 includes 16 rounds. Before the first round there is an initial permutation (IP) 110, and after the last round there is a final permutation (FP) 140. The 64-bit input of a round in divided into two 32-bit halves 102, 104. The right half becomes the left half of the next round. In addition, a round function (F) 120 is applied to the right half and the result is XORed 130 with the left half. This produces the right half of the next round. Such a structure is called a Feistel scheme. This round structure is repeated for 16 rounds.

The right-hand side of FIG. 1 depicts the round function (F) 120 of DES. First, its 32-bit input is expanded to 48 bits by copying 16 of its bits (the outer 2 bits of the nibbles) by the expansion operator (E) 122. The expanded 48 bits of output are XORed 124 with round subkey. This results in eight 6-bit values that are input into 8 different S-boxes (S1-S8) 126. Each of the S-boxes in the set of S-boxes (S1-S8) 126 are the same for different rounds. Each S-box maps its 6-bit input to a 4 bit output. The 32-bit output of the round function is finally obtained by applying a fixed 32-bit permutation (P) 128 on the output of the S-boxes.

Now a description of a white-box DES implementation is provided.

Figure 2:
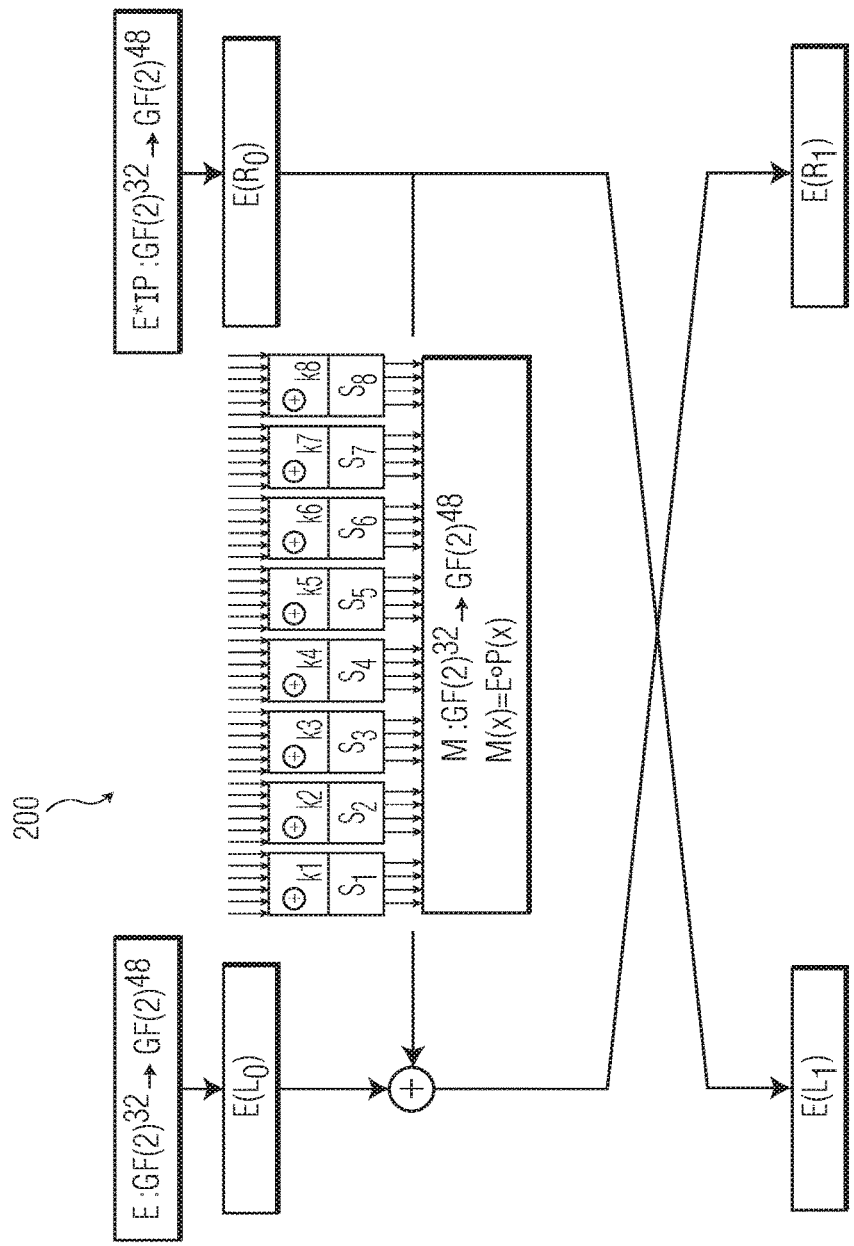
FIGS. 2, 3, and 4 illustrate an alternative formulation of DES.
Figure 3:
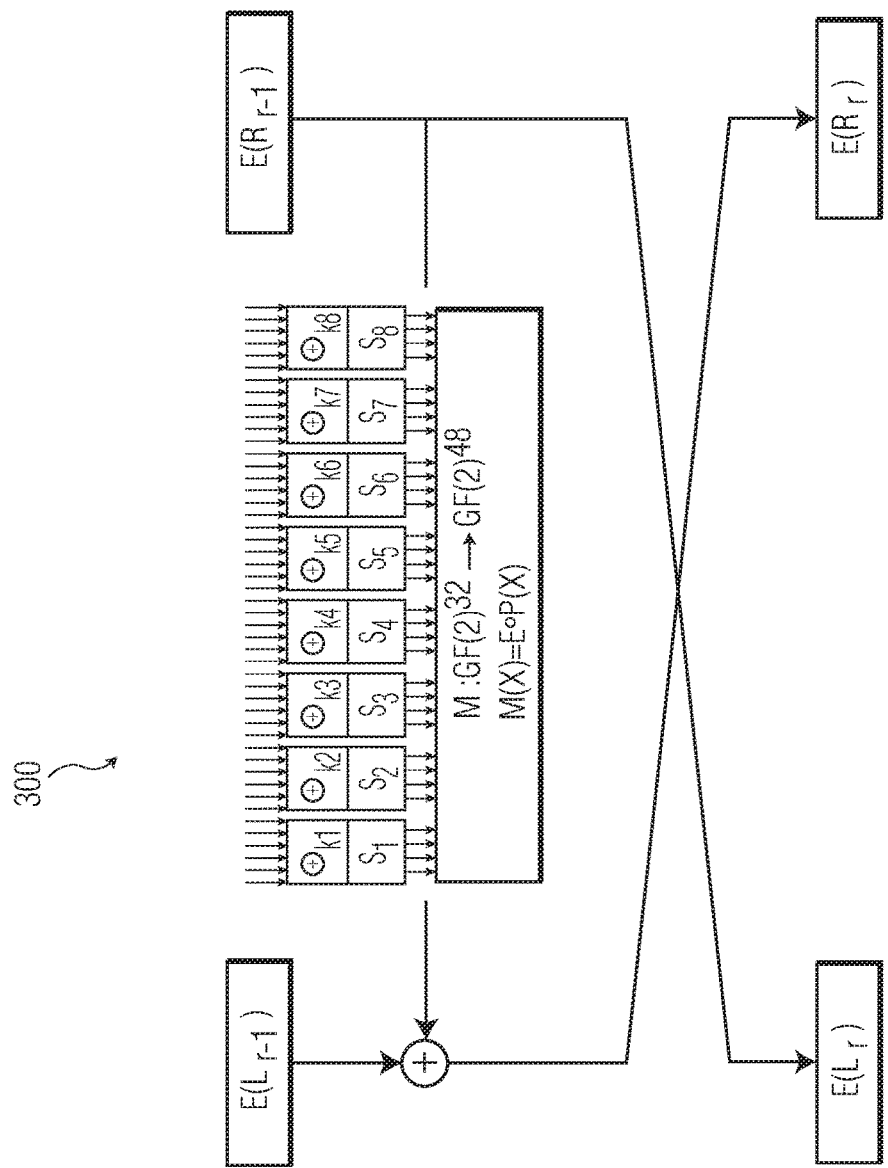
Figure 4:
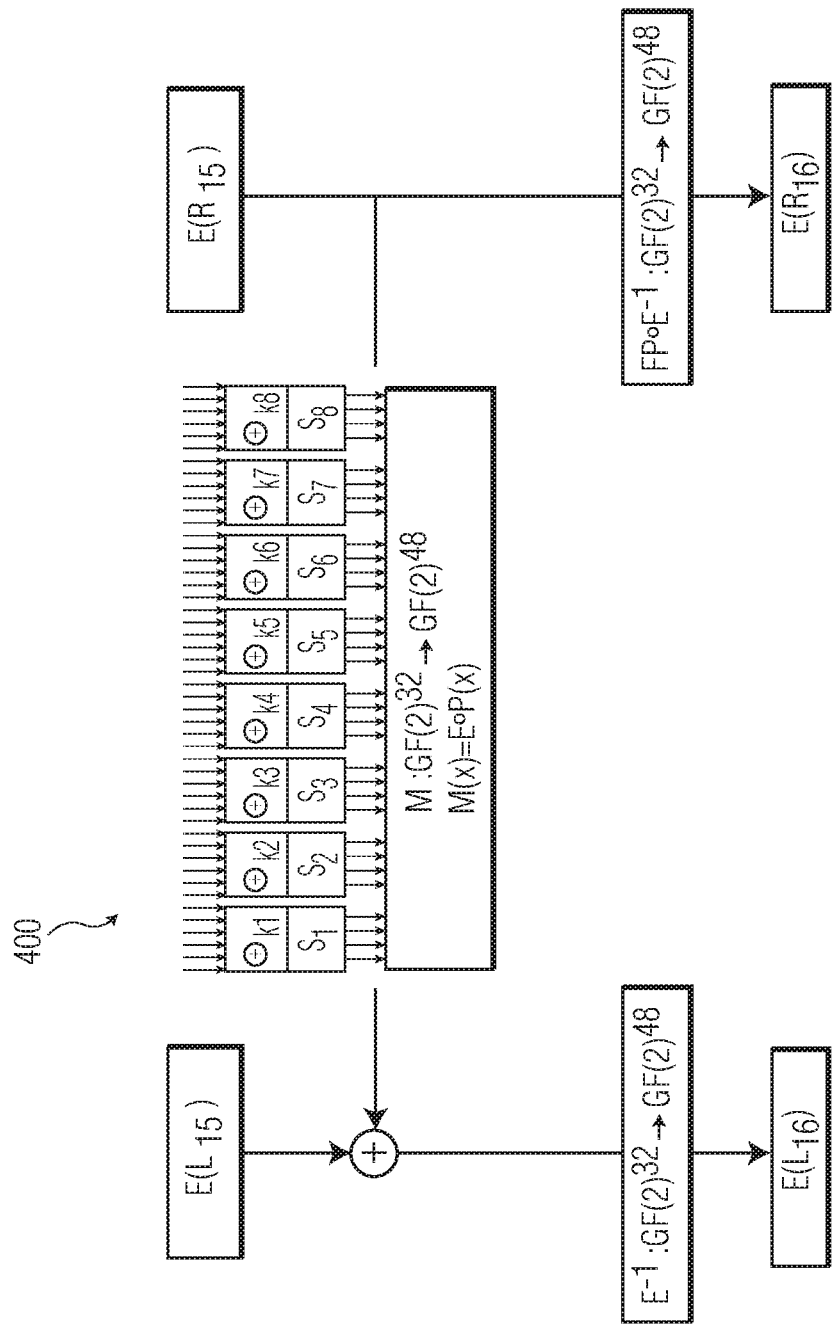

First an alternative formulation 200 of DES is determined as illustrated in FIGS. 2-4. Instead of a 64-bit data block that is split into a 32-bit left half and a 32-bit right half, the intermediate value become these two values to which the expansion operator is applied. For the first round, as shown in FIG. 2, this means that the input has to be preprocessed with the expansion operator, and for the last round, as shown in FIG. 4, it means that the output has to be postprocessed by removing the copy of the bits that are duplicated by the expansion operator. This postprocessing operation is denoted as $E^{-1}$. For the intermediate rounds, as shown in FIG. 3, it means that, instead of applying the expansion operator to the input of the S-boxes of round r, the expansion operator is applied to the output of the round function in the previous round r-1. That is, the expansion operator is applied after the permutation operation. By merging the permutation and expansion operation into a multiplication with a single matrix M and by integrating the key-addition operation in the S-box operation, the formulations depicted in FIGS. 2, 3, 4, 5, and 6 are obtained. Based on these formulations, a white-box implementation will be derived.

The derivation of the white-box implementation includes two steps. In the first step, the implementation is written as a network of lookup tables. In the second step, the obtained network of lookup tables are obfuscated.

Writing DES as network of lookup tables

Figure 5:
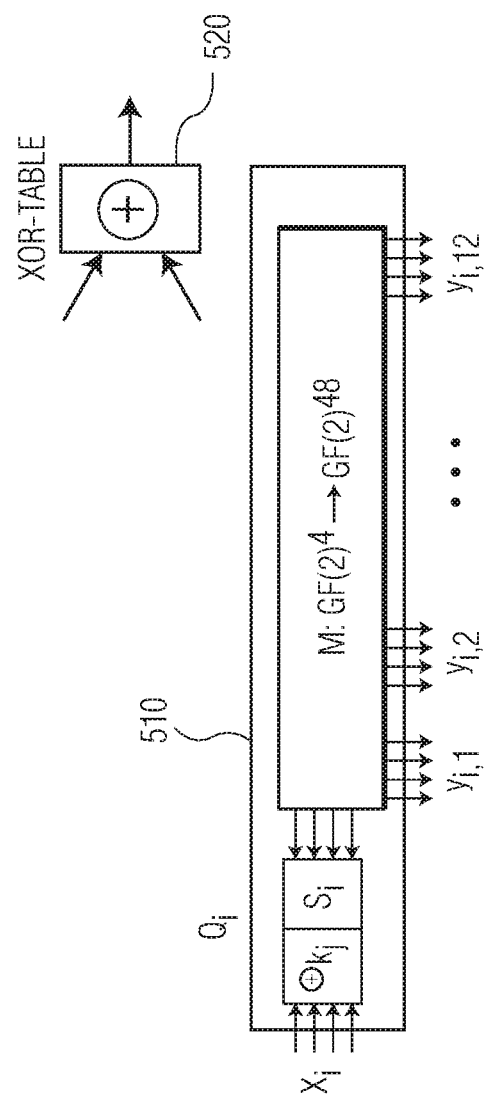
FIG. 5 illustrates a white-box implementation of the round function and XOR function of the DES cipher using only lookup tables.

First, the matrix M is partitioned into 8 stripes of 4 columns, that is, $M_i$ with i=1, 2, . . . , 8 is defined as a 48 by 4 matrix, such that $M=(M_1 M_2 \ldots M_8)$. In order to simplify the notation, $M_i$ is also as the linear mapping associated with the matrix multiplication with $M_i$. Then, the 48-bit output of the round function is given by $y = \oplus_{j=1}^{8} M_i \circ S_i(x_i)$. If an 6-to-48-bit lookup table $Q_i$ 510 is defined for each function such that $Q_i: y_i = M_i \circ S_i(x_i)$, and if a lookup table for the XOR of two 3-bit words is defined, the computation of the round-function output y may be written as a network of lookup tables where the output y is calculated as $y = \oplus_{j=1}^{8} M_i \circ S_i(x_i)$. Furthermore, by using XOR-lookup tables 520, the Feistel structure may be implemented by only using lookup tables. FIG. 5 illustrates a white-box implementation of the round function and XOR function of the DES cipher using only lookup tables. To implement a round of the DES cipher, eight Q-tables $Q_1 \ldots Q_8$ would be needed with a number of XOR-lookup tables 520 to combine the outputs of the eight Q-tables.

Obfuscating Network of Lookup Tables

Figure 6:
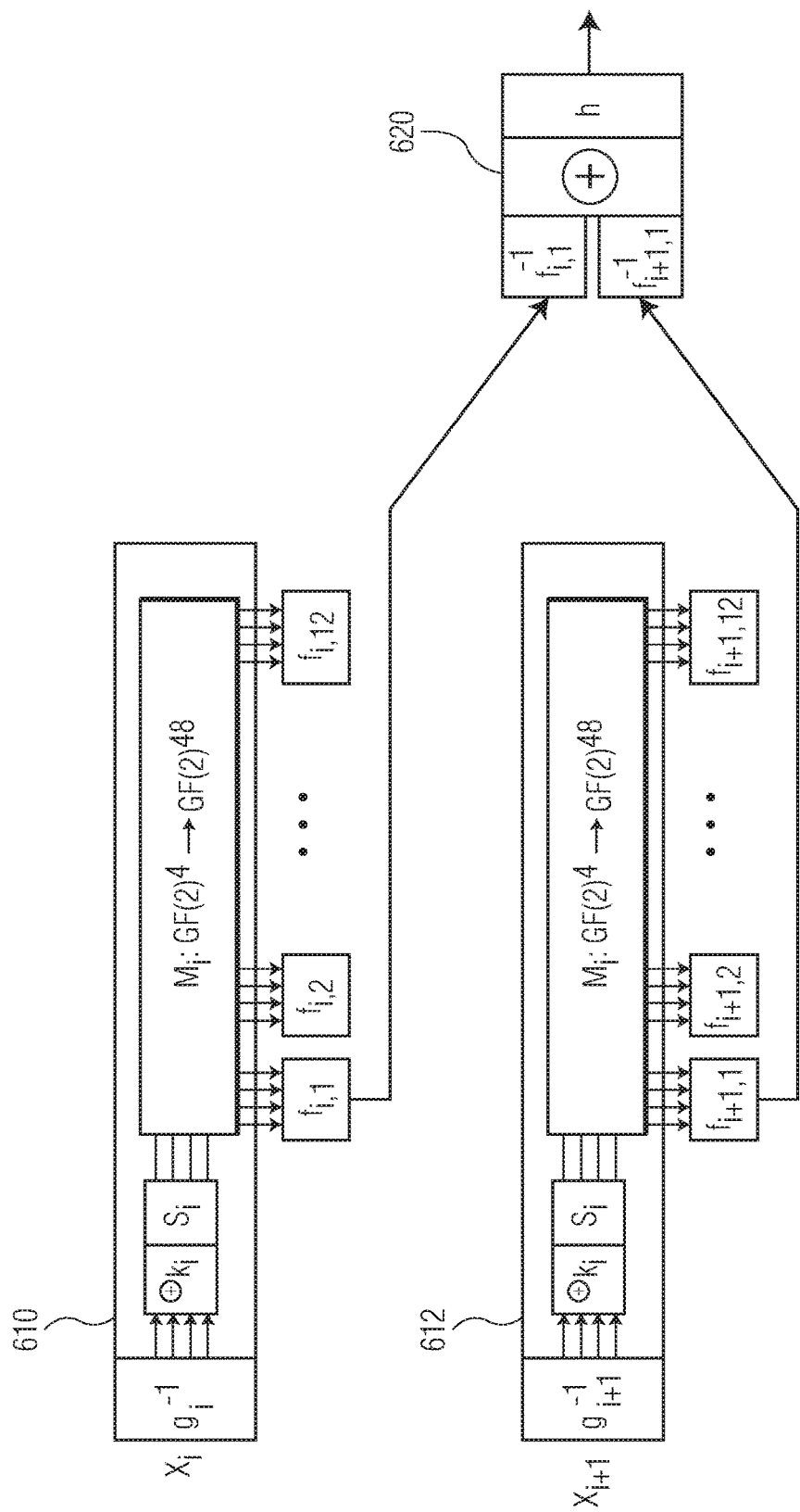
FIG. 6 illustrates the obfuscation of the white-box implementation of FIG. 3.

In the implementation described in FIG. 5, the key may easily be extracted from the Q-tables. Just applying the inverse of the expansion operation (E), permutation operation (P), and S-box operation to the output gives the plain key-addition operation. To prevent this, the input and outputs of all lookup tables may be encoded with arbitrary bijective functions. This means that a lookup table is merged with an encoding function that encodes the output and merged with a decoding function that decodes the input. The encodings are chosen such that the output encoding of one table matches the input encoding assumed in the next tables. FIG. 6 illustrates the obfuscation of the white-box implementation of FIG. 5. More specifically, FIG. 6 illustrates decoding the obfuscated the input of the Q-table using a function $g_i^{-1}$ and obfuscating the twelve outputs of the Q-table using the functions $f_{i,1} \ldots f_{i,12}$. Further the inputs of an XOR-table 620 that succeeds the Q-table a decoded using the appropriate inverse $f_{i,j}^{-1}$. The output of the XOR-table 620 is then encoded using the function h. In this example two Q-tables 610, 612 are illustrated and the first 3 bits of their outputs are combined by the XOR-table 620. This structure can be expanded to implement the complete round functions. Note that in the white-box implementation obtained, both the lookup tables and the intermediate values are obfuscated. For the first round, the input of the Q-tables does not have an input decoding in order to be compatible with DES. For the same reason, there are no output encodings on the last XOR-tables of the last round.

It will now be shown how the above implementation may be modified as described above to overcome the vulnerabilities described above. The description of the modification is based on the non-obfuscated table-based implementation depicted in FIGS. 2, 3, 4, and 5. A white-box implementation with encoded intermediate results can next be obtained by obfuscating the network of lookup tables in the same way as presented above in FIG. 6, i.e., by merging lookup tables with encoding and decoding functions.

The essential feature of the embodiment of the invention may be formulated as follows: if a part of the output of a basic block B is added to $L_0$ to obtain $R_1$, where this part is dependent of a right-half input bit b, then the output of B also contains a part that is dependent of b which contributes to $L_1$.

In the implementation of FIG. 5, the basic blocks are the lookup tables. So, this means that if a part of the output v of a lookup table T is used for $E(R_0)$, and this part is dependent of an input bit b from $R_0$ then the output of T also contains a part that is dependent on b and which contributes to $E(L_1)$. The conditions (1) and (2) described above are satisfied for the $Q_i$-table shown in FIG. 5. However, the output of this table clearly does not have the property that part of it is used for $E(L_1)$. Hence, the white-box implementation of FIG. 5 does not overcome the vulnerabilities described above. Because of this an attacker inject values for $E(L_1)$ that are not consistent with values used by the round functions which leads to a vulnerability that may be used to extract key information.

An easy method to ensure that the output of the $Q_i$-table is also used for $E(L_1)$ is to extend the output of the table such that besides the round function, it also computes $E(L_1)$.

Figure 7:
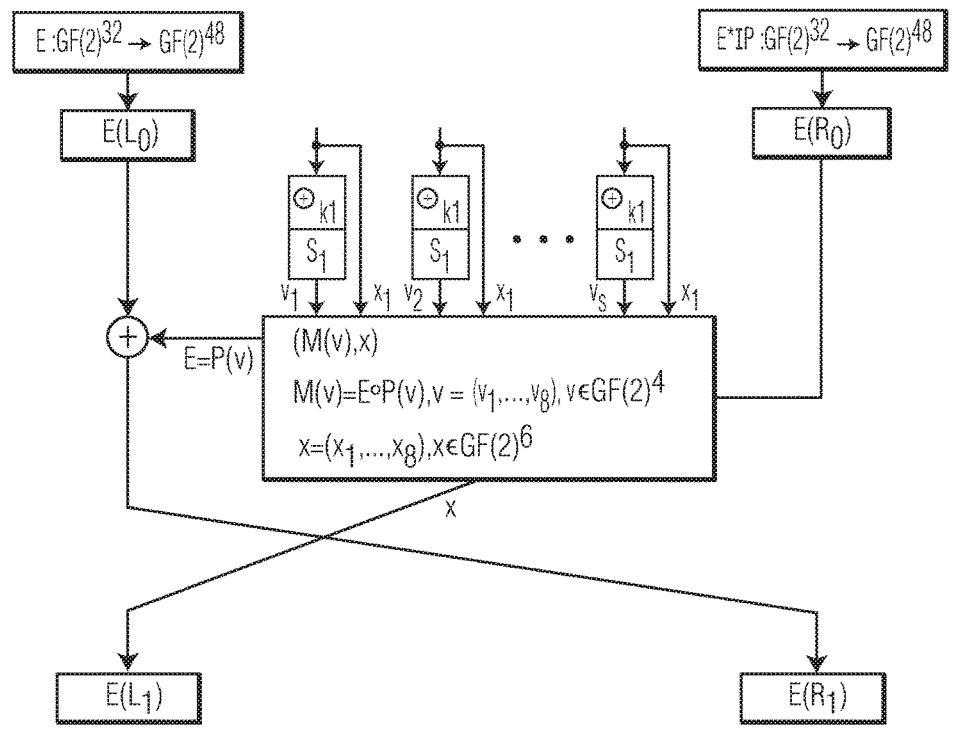
FIG. 7 illustrates a modification of FIG. 5 that outputs $E(L_1)$ as part of the calculation of $E \circ P(v)$.
Figure 8:
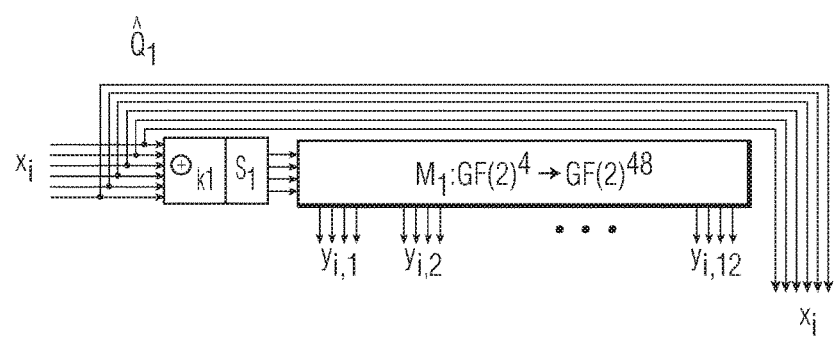
FIG. 8 illustrates a modified $Q_i$-table.

To see how this can be done, first observe that the first round of DES can be written as depicted in FIG. 7. FIG. 7 illustrates a modification of FIG. 5 that outputs $E(L_1)$ as part of the calculation of $E \circ P(v)$. Hence, the left-hand side value $E(L_1)$ is taken from the input of the S-boxes instead of the input of the round function. If this is now implemented by a network of lookup tables as described above, i.e., by splitting the matrix M, an implementation of the first round of DES results including of the $\hat{Q}_i$ tables is depicted in FIG. 8 and XOR-tables are used as described above to combine the outputs of the $\hat{Q}_i$-tables. FIG. 8 illustrates a modified $Q_i$-table. These $Q_i$-tables have a 6-bit input; however, the output of the $Q_i$-table increases by 6 bits from 48 bit to 54 bits. The 6 additional bits become part of the value $E(L_1)$, that is the six additional bits of the eight $Q_i$-tables may be combined to form the value $E(L_1)$.

It can be verified that this lookup table satisfies the property described above: for any bit b of the six input bits of $\hat{Q}_i$ it holds that the output contains a part that is dependent on b and which contributes to $E(R_1)$ and it contains a part that is dependent on b and which contributes to $E(L_1)$. Because this is done in a single basic block, an attacker cannot cause two different values of b to be used in the white-box implementation. Thus, the above identified vulnerability may be overcome.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Figure 9:
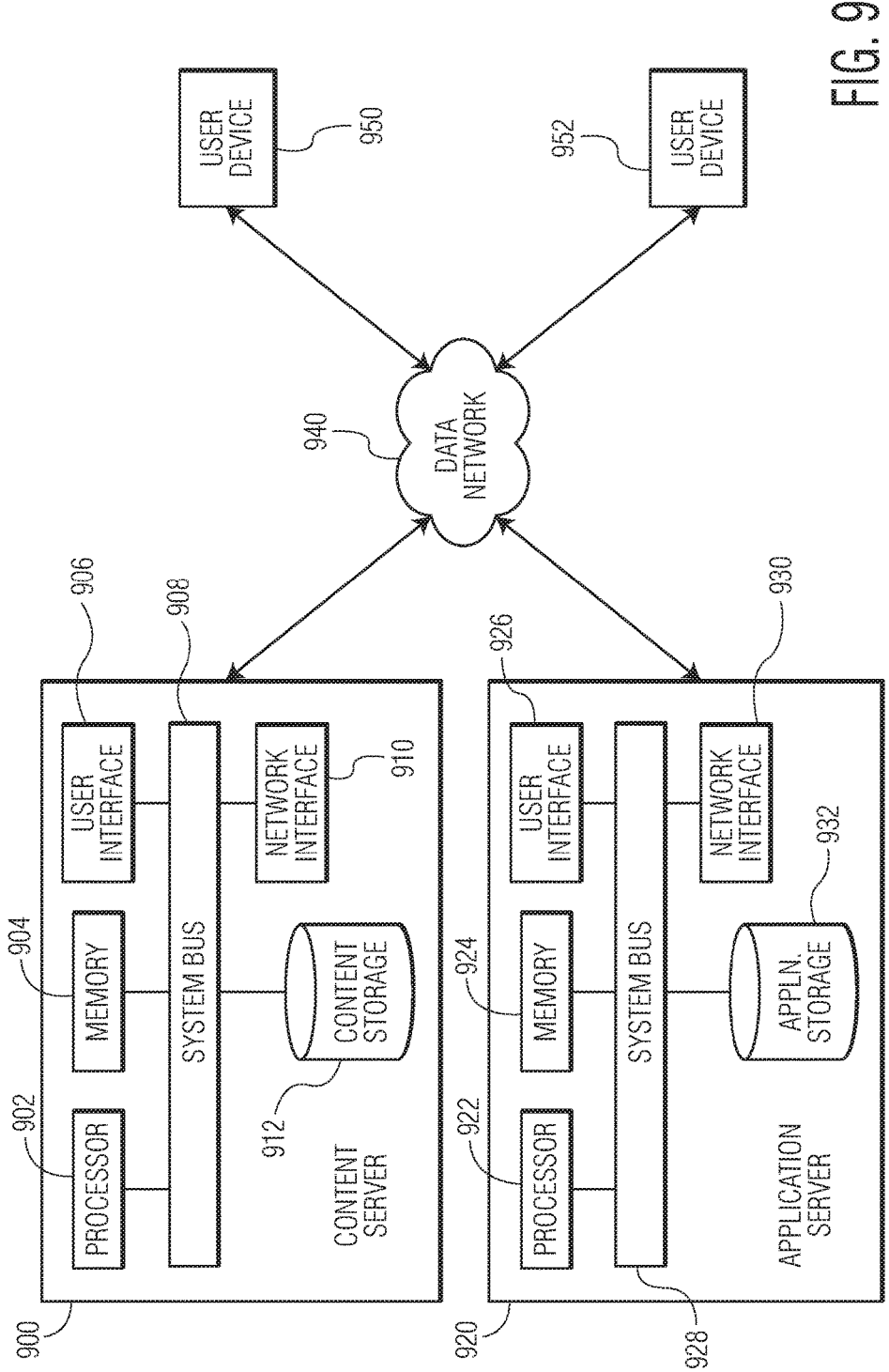
FIG. 9 illustrates a system for providing a user device secure content and a software application that processes the secure content.

FIG. 9 illustrates a system for providing a user device secure content and a software application that processes the secure content. The system includes a content server 900, application server 980, user devices 950, 952, and a data network 940. The user devices 950, 952 may request access to secure content provided by the content server 900 via data network 940. The data network can be any data network providing connectivity between the user devices 950, 952 and the content server 900 and application server 980. The user devices 950, 952 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 900. The software application may be downloaded from the application server 980. The software application may be obscured using the techniques described above as well as operate as described above. Once the user devices 950, 952 install the software application, the user device may then download secure content from the content server 900 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 900 may control the access to the secure content provided to the user devices 950, 952. As a result when the content server 900 receives a request for secure content, the content server 900 may transmit the secure content to the requesting user device. Likewise, the application server 920 may control access to the software application provided to the user devices 950, 952. As a result when the content server 920 receives a request for the software application, the application server 920 may transmit the software application to the requesting user device. A user device requesting the software application or secure content may also be authenticated by the respective servers, before providing the software application or secure content to the user device.

The content server 900 may include a processor 902, memory 904, user interface 906, network interface 910, and content storage 912 interconnected via one or more system buses 980. It will be understood that FIG. 9 constitutes, in some respects, an abstraction and that the actual organization of the components of the device 900 may be more complex than illustrated.

The processor 902 may be any hardware device capable of executing instructions stored in memory 904 or storage 912. As such, the processor may include a microprocessor, field programmable gate array (FPGA), application-specific integrated circuit (ASIC), or other similar devices.

The memory 904 may include various memories such as, for example L1, L2, or L3 cache or system memory. As such, the memory 902 may include static random access memory (SRAM), dynamic RAM (DRAM), flash memory, read only memory (ROM), or other similar memory devices.

The user interface 906 may include one or more devices for enabling communication with a user such as an administrator. For example, the user interface 906 may include a display, a mouse, and a keyboard for receiving user commands.

The network interface 910 may include one or more devices for enabling communication with other hardware devices. For example, the network interface 910 may include a network interface card (NIC) configured to communicate according to the Ethernet protocol. Additionally, the network interface 910 may implement a TCP/IP stack for communication according to the TCP/IP protocols. Various alternative or additional hardware or configurations for the network interface 910 will be apparent.

The content storage 912 may include one or more machine-readable content storage media such as read-only memory (ROM), random-access memory (RAM), magnetic disk storage media, optical storage media, flash-memory devices, or similar storage media. In various embodiments, the content storage 912 may store content to be provided to users.

The application server 920 includes elements like those in the content server 900 and the description of the like elements in the content server 900 apply to the application server 920. Also, the content storage 912 is replaced by application storage 932. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of mapping an input message to an output message by a white-box implementation of a data encryption standard (DES) cryptographic operation, wherein the DES cryptographic operation includes a plurality of basic blocks, wherein each basic block performs a portion of a round function of the DES cryptographic operation, comprising:
   receiving an input having a first half including eight at-least-4-bit portions and a second half including eight at-least-4-bit portions;
   performing, by eight basic blocks of the plurality of basic blocks, a portion of the round function on the second half to produce eight obfuscating encoded at-least-4-bit portions of an obfuscating encoded output, and wherein the plurality of basic blocks provides the eight at-least-4-bit portions of the second half as an obfuscating encoded first input to a next round; and
   performing eight XORs of eight obfuscating encoded at-least-4-bit portions of the obfuscating encoded output and the eight at-least-4-bit portions of the first half to produce eight at-least-4-bit-bit portions of an obfuscating encoded second input to the next round.

2. The method of claim 1, wherein the round function includes a key addition, a substitution function, a permutation function, and an expansion operation.

3. The method of claim 1, wherein each of the basic blocks includes receiving an at-least-4-bit input, performing a key addition on the at-least-4-bit input, inputting the output of the key addition to a substitution function, and applying a linear mapping on the output of substitution function to produce a basic block output.

4. The method of claim 3, wherein producing eight obfuscating encoded at least-4-bit portions of an obfuscating encoded output further comprising combining the basic block outputs from the eight basic blocks to produce a 48-bit obfuscating encoded output.

5. The method of claim 1, wherein the plurality of basic blocks is a plurality of lookup tables.

6. The method of claim 1, wherein the plurality of basic blocks is a plurality of finite state machines.

7. A non-transitory machine-readable storage medium encoded with instructions for implementing mapping an input message to an output message by a white-box implementation of a data encryption standard (DES) cryptographic operation, wherein the DES cryptographic operation includes a plurality of basic blocks, wherein each basic block performs a portion of a round function of the DES cryptographic operation, comprising:
   instructions for receiving an input having a first half including eight at-least-4-bit portions and a second half including eight at-least-4-bit portions;
   instructions for performing, by eight basic blocks of the plurality of basic blocks, a portion of the round function on the second half to produce eight obfuscating encoded at-least-4-bit portions of an obfuscating encoded output, and wherein the plurality of basic blocks provides the eight at-least-4-bit portions of the second half as an obfuscating encoded first input to a next round; and
   instructions for performing eight XORs of eight obfuscating encoded at-least-4-bit portions of the obfuscating encoded output and the eight at-least-4-bit portions of the first half to produce eight at-least-4-bit-bit portions of an obfuscating encoded second input to the next round.

8. The non-transitory machine-readable storage medium of claim 7, wherein the round function includes a key addition, a substitution function, a permutation function, and an expansion operation.

9. The non-transitory machine-readable storage medium of claim 7, wherein each of the basic blocks includes receiving an at-least-4-bit input, performing a key addition on the at-least-4-bit input, inputting the output of the key addition to a substitution function, and applying a linear mapping on the output of substitution function to produce a basic block output.

10. The non-transitory machine-readable storage medium of claim 9, wherein producing eight obfuscating encoded at least-4-bit portions of an obfuscating encoded output further comprising combining the basic block outputs from the eight basic blocks to produce a 48-bit obfuscating encoded output.

11. The non-transitory machine-readable storage medium of claim 7, wherein the plurality of basic blocks is a plurality of lookup tables.

12. The non-transitory machine-readable storage medium of claim 7, wherein the plurality of basic blocks is a plurality of finite state machines.

* * * * *